(12) United States Patent
Kim

(10) Patent No.: US 10,107,428 B2
(45) Date of Patent: Oct. 23, 2018

(54) CLAMP FOR CONNECTING PIPE AND DEVICE FOR CONNECTING PIPE INCLUDING THE SAME

(71) Applicant: HI-STEN.CO., LTD., Gimhae-si, Gyeongsangnam-do (KR)

(72) Inventor: Jong Jae Kim, Gimhae-si (KR)

(73) Assignee: HI-STEN. CO., LTD., Gyeongsangnam-do (KR)

( * ) Notice: Subject to any disclaimer, the term of this patent is extended or adjusted under 35 U.S.C. 154(b) by 650 days.

(21) Appl. No.: 14/435,441

(22) PCT Filed: Sep. 9, 2013

(86) PCT No.: PCT/KR2013/008123
§ 371 (c)(1),
(2) Date: Apr. 13, 2015

(87) PCT Pub. No.: WO2014/081111
PCT Pub. Date: May 30, 2014

(65) Prior Publication Data
US 2015/0233506 A1  Aug. 20, 2015

(30) Foreign Application Priority Data

Nov. 26, 2012 (KR) .................. 10-2012-0134260
Nov. 30, 2012 (KR) .................. 10-2012-0137597

(51) Int. Cl.
*F16L 21/06* (2006.01)
*F16L 21/03* (2006.01)
*F16L 23/04* (2006.01)

(52) U.S. Cl.
CPC ............. *F16L 21/065* (2013.01); *F16L 21/03* (2013.01); *F16L 23/04* (2013.01)

(58) Field of Classification Search
CPC ......... F16L 21/03; F16L 21/065; F16L 23/04; F16L 19/06
(Continued)

(56) References Cited

U.S. PATENT DOCUMENTS 1,830,782 A * 11/1931 Burnish .................. F16L 23/04
                                                           285/420 X
2,953,398 A   9/1960 Haugen et al.
(Continued)

FOREIGN PATENT DOCUMENTS

DE   2922403 A1   12/1979
EP   2273163 A2    1/2011
(Continued)

*Primary Examiner* — Greg Binda
*Assistant Examiner* — Zachary T Dragicevich
(74) *Attorney, Agent, or Firm* — Novick, Kim & Lee, PLLC; Jae Youn Kim

(57) ABSTRACT

A clamp is provided which can be mounted on a flange for connecting a second pipe to a first pipe to prevent the second pipe from being separated. The clamp includes a clamping body formed by coupling at least two assembly members each of which has an arc shape; and a pressing part disposed inside the clamping body to press an outer circumferential surface of the second pipe that is inserted into the clamping body, wherein the pressing part gradually protrudes toward a center of the clamping body along a direction in which the second pipe is inserted to allow the second pipe to be easily inserted and prevent the second pipe from being separated.

17 Claims, 13 Drawing Sheets

(58) Field of Classification Search
USPC ....... 285/337, 408, 419, 420, 373, 421, 104,
285/105, 339, 374, 376, 377
See application file for complete search history.

(56) References Cited

U.S. PATENT DOCUMENTS

| | | | |
|---|---|---|---|
| 5,145,220 A | 9/1992 | Burkholder | |
| 5,190,324 A * | 3/1993 | Bird | 285/373 X |
| 7,490,866 B2 * | 2/2009 | Webb | F16L 21/065 |
| | | | 285/419 X |
| 2006/0157941 A1 | 7/2006 | Vitel et al. | |
| 2006/0267343 A1 * | 11/2006 | Wright | 285/373 |
| 2011/0140369 A1 | 6/2011 | Lenhert | |
| 2011/0210543 A1 * | 9/2011 | German | 285/337 X |
| 2012/0256416 A1 * | 10/2012 | Ikeda | |

FOREIGN PATENT DOCUMENTS

| | | |
|---|---|---|
| JP | 2005-238760 A | 9/2005 |
| JP | 2009-041712 A | 2/2009 |
| KR | 20-0363185 Y1 | 9/2004 |
| KR | 10-0808545 B1 | 3/2008 |
| KR | 10-0997534 B1 | 12/2010 |
| KR | 10-0999881 B1 | 12/2010 |
| KR | 20-2010-0012659 U | 12/2010 |
| KR | 10-2012-0034274 A | 4/2012 |
| KR | 10-1207634 B1 | 12/2012 |

\* cited by examiner

CLAMP FOR CONNECTING PIPE AND DEVICE FOR CONNECTING PIPE INCLUDING THE SAME

TECHNICAL FIELD

The present invention relates to a clamp for connecting a pipe and a device for connecting the pipe including the same, and more particularly, to the clamp and the device providing a fixing force when the pipe is connected.

BACKGROUND ART

Recently, there is an increasing interest in water quality of a water supply. Accordingly, a water pipe formed of stainless steel that is known as the most suitable pipe for the water quality is under the spotlight.

The water pipe embedded under the ground to supply running water has to have corrosion resistance for protecting the water quality therein. Also, watertightness in a connection part, separation prevention ability due to a water pressure, convenience in installation, and structural stability for the changes of external environments are required. A stainless steel pipe is known as a pipe having material characteristics that are most suitable for conditions required for this water pipe. If the stainless steel pipe has a relatively small diameter of about 13 A (0.8 T) to about 50 A (1.2 T), a press-type pipe fitting in which a rubber ring is inserted into a socket of which a pipe end is expanded, and a pipe is pushed to bond the pipes in a press type manner using a mechanical force may be used.

However, since the stainless steel pipe having a diameter of about 80 A or more has a thickness of about 2.0 T or more, it is impossible to perform works in a site in the press type manner. Thus, a welding operation has to be performed to connect the pipes. Here, it is significantly difficult to weld and connect the pipes each of which has a diameter of about 80 A or more in the work site, and thus a skilled engineer for welding may be needed, and a working process may be delayed.

Therefore, the water pipe having a diameter of about 80 A or more mostly adopts a cast iron pipe. However, since the cast iron pipe is heavy, it is difficult to be transported and installed, and when a branch pipe is provided, rust can occur around a fumarole. Also, a separate coating process has to be performed to prevent the rust from occurring on the pipe, thereby incurring excessive manufacturing costs.

To solve the limitations in the related art, there is Korean Patent Registration No. 10-0999881, which is entitled as "stainless steel pipe for water supply (hereinafter, referred to as a "related art")". The related art is characterized in that a synthetic resin coating layer is formed on an outer surface of the stainless steel pipe.

However, since the synthetic resin coating layer is formed on the outer surface of the stainless steel pipe, manufacturing costs are expensive. Also, when stainless pipes are connected to each other, a pre-task in which a fixing band is coupled to an outer diameter portion of a pipe insertion part of one side of the stainless pipe is needed, and then an exclusive work tool has to be used to connect the stainless pipes to each other, and thus the work is not simple. Here, improvement in connection of the stainless steel pipe are required.

Also, since the stainless steel pipe has high rigidity, it is relatively difficult to fix a clamp for connecting the fittings and to make a passive pipe work in the site difficult.

The present invention has been invented to solve the limitations in the related art.

DISCLOSURE

Technical Problem

The present invention provides a pipe connection unit having a structure that is capable of minimizing a pre-task so that the pipe connection unit is applied to connect stainless steel pipes or pipes having large diameters to each other.

Also, the present invention provides a pipe connection unit which is convenient in installation without using a separate exclusive tool.

Also, the present invention provides a pipe connection unit having an improved watertightness structure.

Technical Solution

According to an aspect of the present invention, there is provided a clamp mounted on a flange for connecting a second pipe to a first pipe to prevent the second pipe from being separated, the clamp comprising: a clamping body formed by coupling at least two assembly members each of which has an arc shape; and a pressing part disposed inside the clamping body to press an outer circumferential surface of the second pipe that is inserted into the clamping body, wherein the pressing part gradually protrudes toward a center of the clamping body along a direction in which the second pipe is inserted to allow the second pipe to be easily inserted and prevent the second pipe.

The pressing part may have at least one shape of a cone shape and a polygonal cone shape having an apex oriented a direction in which the second pipe is separated and a bottom surface facing a direction in which the second pipe is inserted, or the pressing part may have at least one shape of a cone shape and a polygonal shape of which a relatively small bottom surface faces the direction in which the second pipe is separated and a relatively large bottom surface faces the direction in which the second pipe is inserted.

The pressing part may protrude integrally from an inner circumferential surface of the clamping body.

The clamp may further include a pressing part fixing member having elasticity and disposed on the inner circumferential surface of the clamping body and on which the pressing part is disposed, wherein the clamping body may comprise a fixing member accommodation part defined to be stepped from the inner circumferential surface thereof in a predetermined depth to accommodate the pressing part fixing member so that the pressing part fixing member is not separated to the outside.

The clamping body may comprise a hook part having a ring shape so that a first fixing projection protruding from an outer circumferential surface of the flange is inserted into the hook part and is connected to the flange.

The clamping body may comprise a second fixing projection radially protruding from the outer circumferential surface thereof so that the second fixing projection is inserted into a hook part of a clamping body adjacent to the second projection and connected to the clamping body adjacent thereto.

Each of the assembly members may comprise extension parts extending outward on ends thereof, and each of the extension parts may comprise a coupling hole passing therethrough to couple the assembly members to each other.

At least one of the extension parts may comprise a spacing part protruding therefrom so that the extension parts adjacent to each other are spaced apart from each other.

According to an aspect of the present invention, there is provided a device for connecting a pipe for connecting a second pipe to a first pipe, the device comprising: a clamp comprising a clamping body formed by coupling at least two assembly members each of which has an arc shape and a pressing part disposed inside the clamping body to press an outer circumferential surface of the second pipe that is inserted into the clamping body and gradually protruding toward a center of the clamping body along a direction in which the second pipe is inserted to allow the second pipe to be easily inserted and prevent the second pipe from being separated after the second pipe is inserted; and a flange comprising a flange body having a first accommodation part to which the clamp is connected and accommodating one end of the second pipe and a second accommodation part accommodating one end of the first pipe so that the first and second pipes define successive passages and a packing part disposed between the outer circumferential surface of the second pipe and an inner circumferential surface of the first accommodation part to provide a watertightness structure.

The clamping body may comprise a hook part having a ring shape and protruding from an outer circumferential surface thereof, and the flange body may comprise a first fixing projection protruding from an outer circumferential surface thereof so that the first fixing projection is inserted into the hook part and connected to the clamping body.

The packing part may comprise a first packing having a plurality of fluid receiving grooves for receiving a fluid flowing through the first and second pipes.

The fluid receiving groove may be defined in one shape of oval and spindle shapes and has a long axis in the longitudinal cross-sectional shape, which faces a central axis of the second pipe.

The first packing may comprise an inner space part defined along an inside thereof so that the inner space part communicates with the plurality of fluid receiving grooves to allow the plurality of fluid receiving grooves to be connected to each other.

The inner space part may have an oval longitudinal section shape or a spindle longitudinal section shape and have a short axis in the longitudinal cross-sectional shape, which faces a central axis of the second pipe.

The first packing may comprise a cutoff line that is cut from the inner space part to the outside.

The device may further include a reinforcement ring inserted into the fluid receiving groove to be maintained in a predetermined cross-sectional shape to reinforce rigidity so that a passage is secured even though the fluid receiving groove is pressed by an external force.

The flange body may comprise an insertion restriction part protruding from an inner circumferential surface of the second accommodation part to restrict an insertion depth of the second pipe.

The packing part may comprise: a second packing disposed between the insertion restriction part and the first packing; and a third packing disposed between the second packing and the insertion restriction part, wherein the second packing has a curved surface that is in contact with the outer circumferential surface of the second pipe.

The insertion restriction part may have an inner end protruding upward to prevent the third packing from being separated.

The device may further include a hygroscopic expansion part formed of a hygroscopic material and disposed in the inner space part to absorb the fluid to improve watertightness performance.

Advantageous Effects

According to the present invention, the slipping may be minimized regardless of the kind of steels to increase structural stability in the pipe fitting.

Also, according to the present invention, the stainless steel having deteriorated in-site mechinability may be installed in the site without the separate pre-task to improve working efficiency and sanitary of the pipe itself.

Also, according to the present invention, the pipe, the flange, and the clamp used in the pipe may be formed of the same material as the stainless steel to prevent corrosion from occurring due to the potential difference between the different materials.

Also, according to the present invention, since it is unnecessary to additionally perform painting or Pe-coating on the surface of the pipe so as to improve the fixing force, the corrosion due to the surface scratch generated when the coating is taken off the surface, or the surface is stabled may not occur. Thus, the clamp and the flange has high stability.

Also, according to the present invention, since the hook structure is used in the coupling part between the clamps or between the clamp and the flange on the basis of the improved fixing force, the functional fitting having a relatively large movable angle in response to the ground subsidence may be provided to ensure structural stability against displacement due to the external force.

Also, according to the present invention, since the clamp is easily installed in the site, if necessary, the plurality of clamps may be successively disposed on the L-shaped or T-shaped pipe requiring a lot of pipe-separation prevention force to ensure structural stability.

BEST MODE

Figure 1:
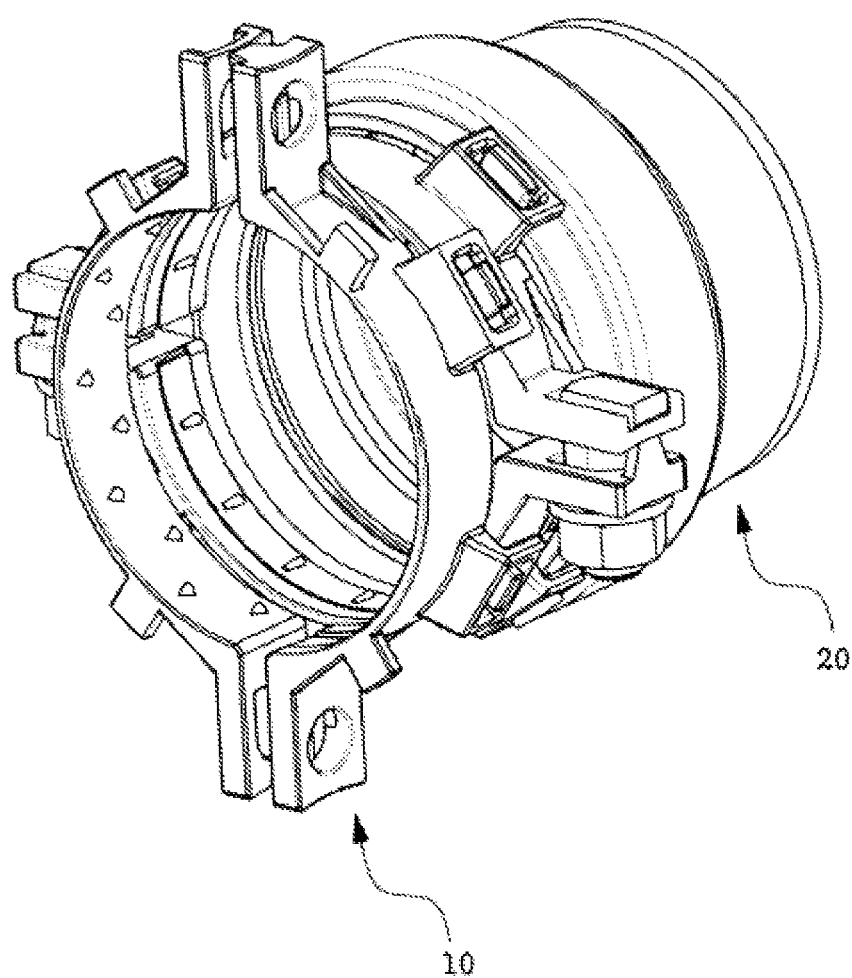
FIG. 1 is a perspective view illustrating a pipe connection flange and a clamp according to an embodiment of the present invention.

A clamp may be mounted on a flange for connecting a second pipe to a first pipe to prevent the second pipe from being separated, the clamp comprising: a clamping body formed by coupling at least two assembly members each of which has an arc shape; and a pressing part disposed inside the clamping body to press an outer circumferential surface of the second pipe that is inserted into the clamping body, wherein the pressing part gradually protrudes toward a center of the clamping body along a direction in which the second pipe is inserted to allow the second pipe to be easily inserted and prevent the second pipe.

Mode for Invention

Hereinafter, embodiments of the present invention will be described with reference to accompanying drawings. If not specifically defined otherwise, the term indicating a direction is described with respect to a state illustrated in the drawings. Also, like reference numerals refer to like elements throughout. Meanwhile, in the figures, the dimensions of components and regions are exaggerated for clarity of illustration and convenience of description and not be limited to the dimensions.

A pipe connection device according to the present invention will be described with reference to FIG. 1. FIG. 1 is a perspective view illustrating a pipe connection flange and a clamp according to an embodiment of the present invention.

The pipe connection device according to the present invention includes a flange 20 and a clamp 10 as illustrated in FIG. 1. The flange 20 is a component that is fixed to one pipe by welding through a pre-task and accommodates an end of the other pipe to be connected to provide a watertightness structure.

The clamp 10 is coupled to the flange 20 to fix the pipe inserted into the flange 20 so that the pipe is not separated from the flange 20. Here, the pipe may be one or an end of a linear type, a T-shaped, and an L-shaped pipe or valve. The present invention will not be limited to the kind of the pipe. Hereinafter, each of the components will be described in detail.

Figure 2:
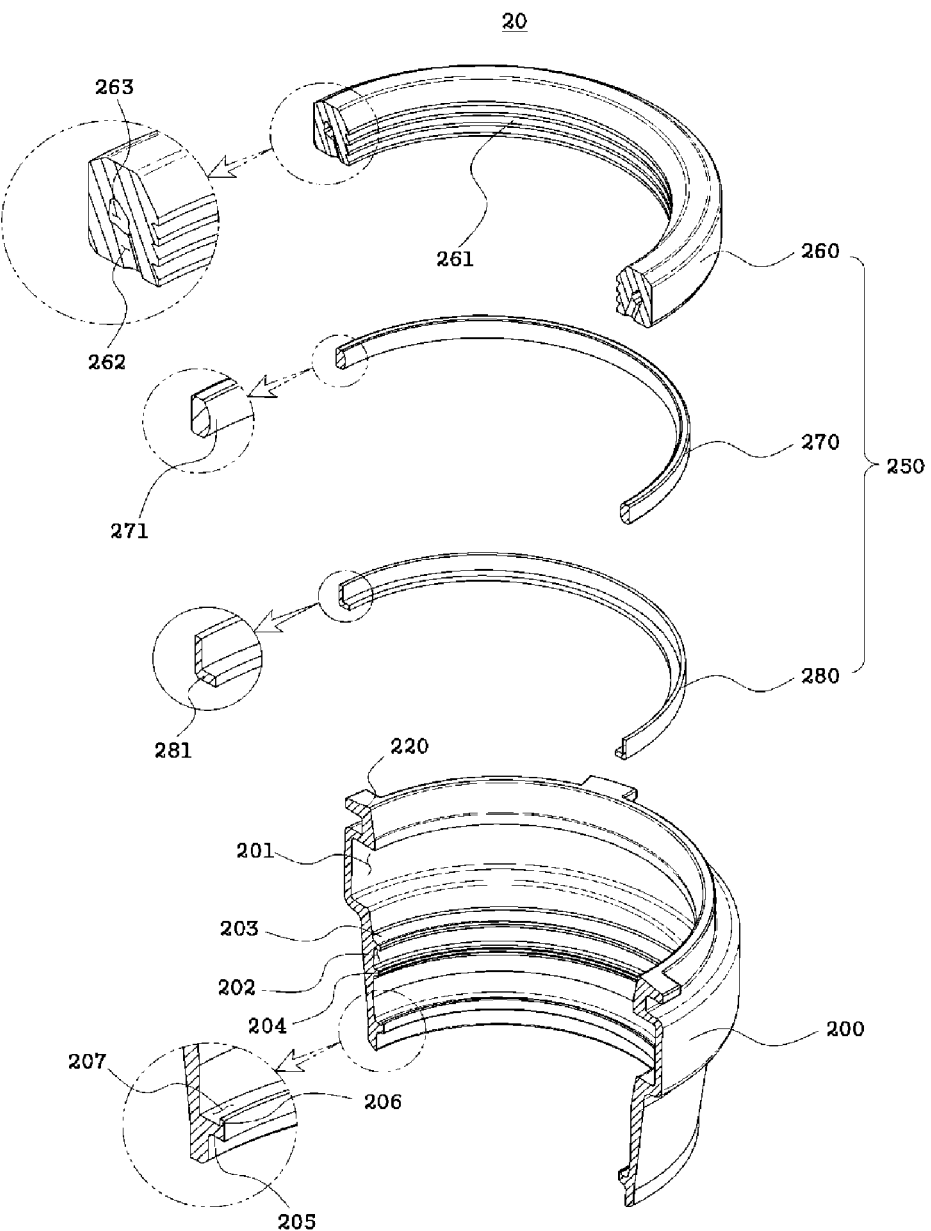
FIG. 2 is a perspective view illustrating a state in which a portion of the flange is cut according to an embodiment.
Figure 3:
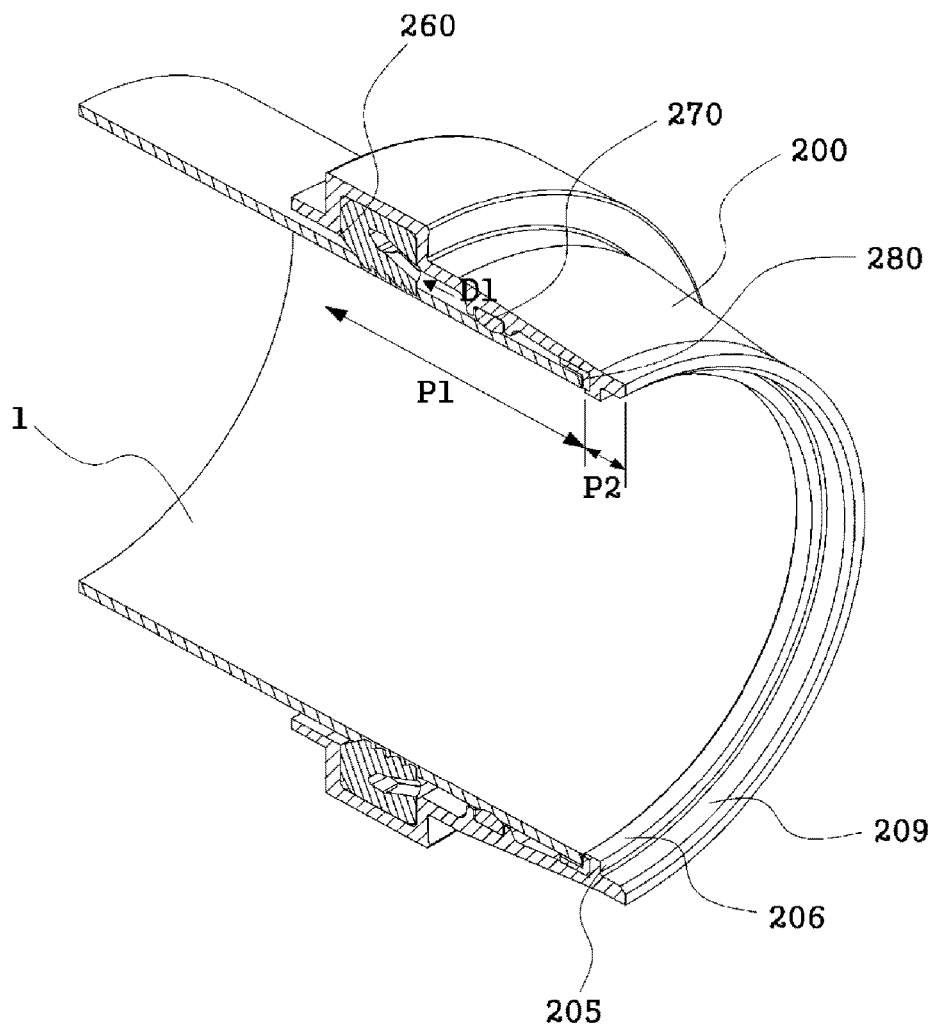
FIG. 3 is a cutoff perspective view illustrating a state in which the flange is cut along a central axis thereof according to an embodiment.
Figure 4:
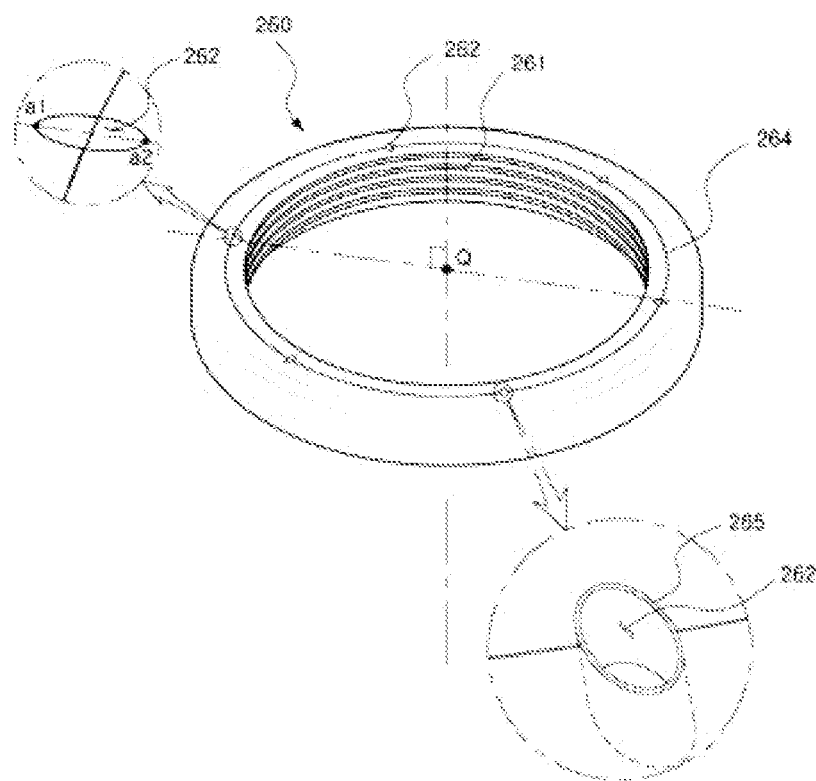
FIG. 4 is a perspective view of a first packing according to an embodiment.
Figure 5:
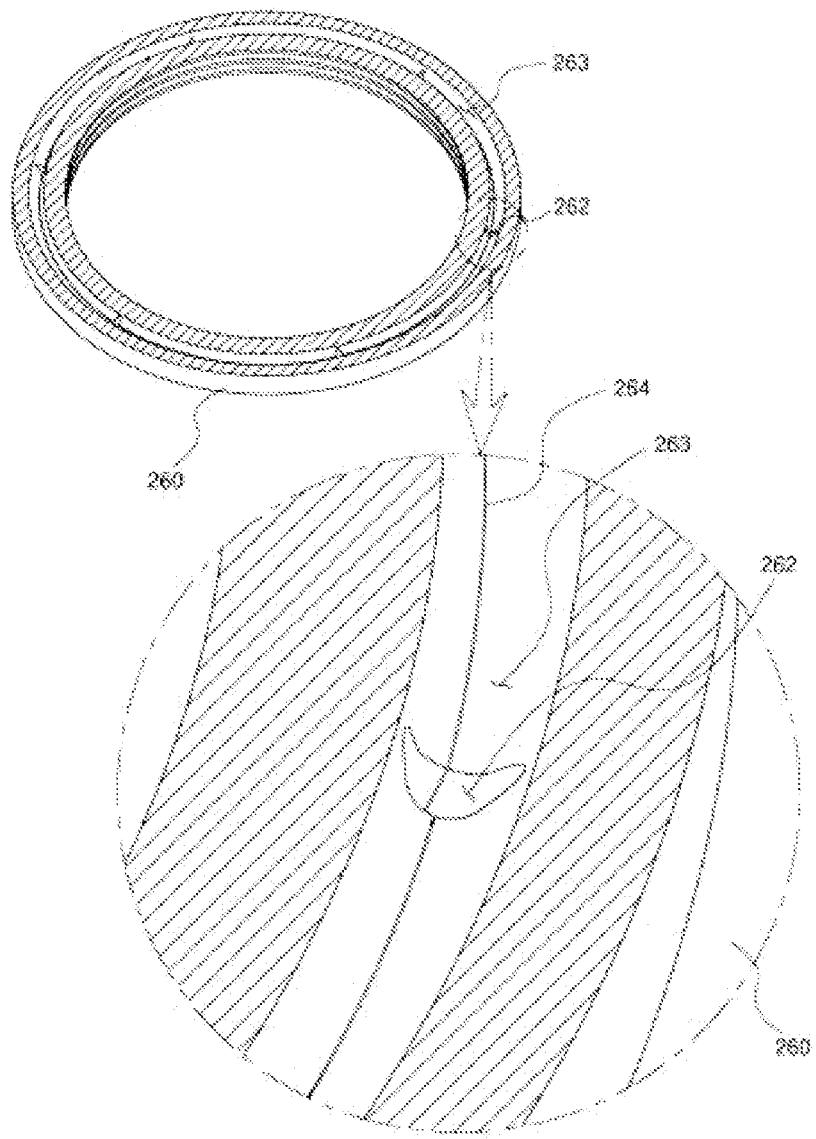
FIG. 5 is a cross-sectional view of the first packing according to an embodiment.
Figure 6:
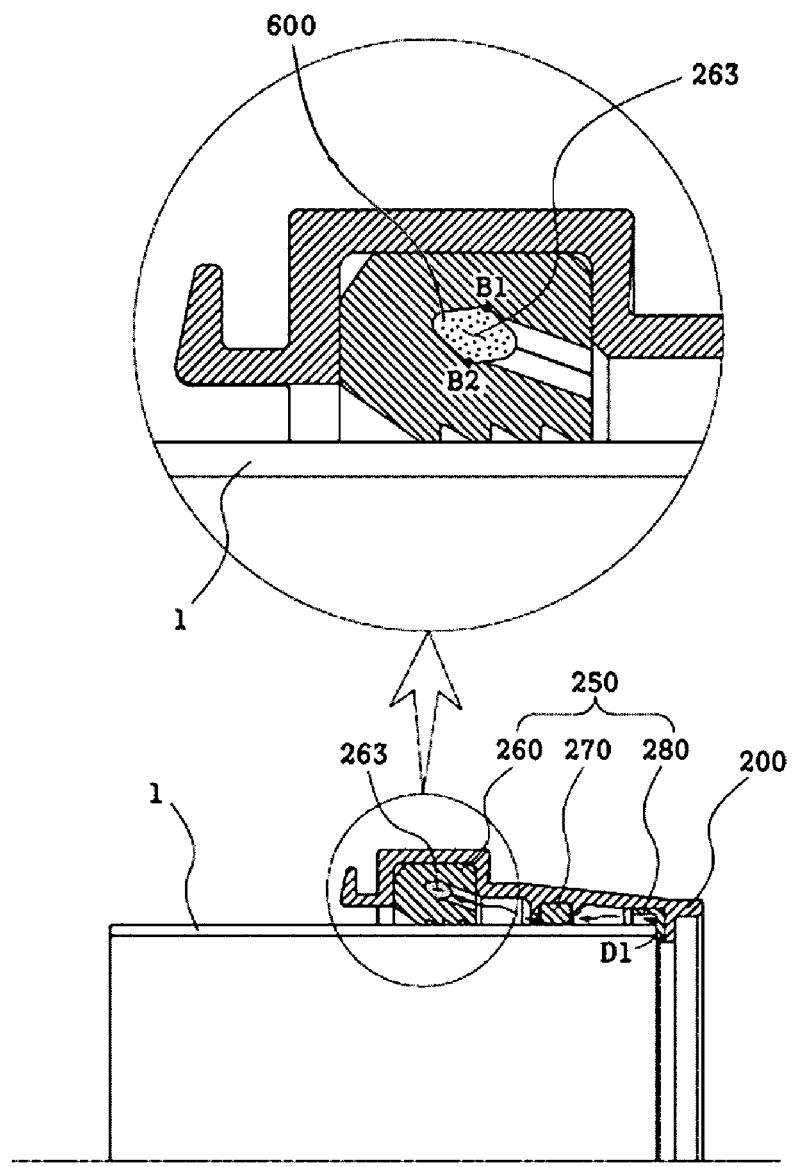
FIG. 6 is a cross-sectional view illustrating a state in which the flange is cut along the central axis thereof according to an embodiment.

A flange according to the present invention will be described with reference to FIGS. 2 to 6. FIG. 2 is a perspective view illustrating a state in which a portion of the flange is cut according to an embodiment. FIG. 3 is a cutoff perspective view illustrating a state in which the flange is cut along a central axis thereof according to an embodiment. FIG. 4 is a perspective view of a first packing according to an embodiment. FIG. 5 is a cross-sectional view of the first packing according to an embodiment. FIG. 6 is a cross-sectional view illustrating a state in which the flange is cut along the central axis thereof according to an embodiment.

Referring to FIG. 2, the flange 20 according to the present invention includes a flange body 200 defining an outer housing and a packing part 250 providing a watertightness structure with respect to the pipe to be accommodated therein.

As illustrated in FIGS. 2 and 3, the flange body 200 has a hollow pipe shape. A first packing accommodation part 201, a second packing accommodation part 202, and an insertion restriction part 205 are successively defined on an inner circumferential surface of the flange body 200 from an upper portion of the flange body 200 in FIG. 2.

The first packing accommodation part 201 may be a predetermined space part defined by protruding outward from the inner circumferential surface of the flange body part 200. The first accommodation part 201 may accommodate a first packing 260 that will be described above to fix the first packing 260 on the inner circumferential surface of the flange body 200.

The second packing accommodation part 202 may be a space between the first protrusion part 203 and a second protrusion part 204 protruding inward along the inner circumferential surface of the flange body 200. A second packing 270 that will be described later may be accommodated into the second packing accommodation part 202 and fixed on the inner circumferential surface of the flange body 200.

The insertion restriction part 205 is a component for restricting an insertion depth of the pipe inserted from the first packing accommodation part 201 toward the second packing accommodation part 202. The insertion restriction part 205 may protrude inward along the inner circumferential surface of the flange body 200. An extension part 206 protruding upward along a central axis direction may be further formed on an inner end of the insertion restriction part 205. The extension part 206 may restrict movement of the inserted pipe or prevent a third packing 280 disposed between the flange body 200 and the pipe from being separated.

Also, a first fixing projection 220 having a hook shape may be formed on an upper end of the flange body 200, i.e., a side in which the pipe is inserted, so that the clamp is coupled thereto.

Hereinafter, as illustrated in FIG. 3, a section of the flange body 200 in which the pipe 1 is inserted and accommodated may be called a first accommodation part P1 for convenience of description. Also, a section in which the other pipe connected to the pipe 1 is accommodated and fixed may be called a second accommodation part P2. Here, the other pipe may be fixed by welding by a welding part 209 disposed on an end of the second accommodation part P2. However, the flange according to the present invention may adopt existing pipe coupling manners such as a screw-coupling manner, as well as the welding manner.

As illustrated in FIG. 2, the second packing 270 has a ring shape. Here, an inner circumferential surface of the second packing 270, i.e., a surface that is in contact with the pipe, may be a curved surface 271. The third packing 280 has a ring shape. An end packing part 281 may extend inward from one end of the third packing 280 to have an L-shaped section shape. The end packing part 281 may contact an end of the above-described pipe to provide a watertightness structure.

As illustrated in FIG. 4, a plurality of fluid receiving grooves 262 may be defined in the first packing 260 in a press direction D1. Each of the fluid receiving grooves 262 may accommodate fluids in the flange 200 and expand when the corresponding fluid increases in pressure, to expand the first packing 260 itself. Also, if the flange 200 including the first packing 260 accommodates the pipe 1 when it is installed, the fluid receiving groove may be somewhat contracted to allow the pipe 1 to be inserted into the flange 200 without a separate tool.

Here, as illustrated in FIG. 4, the fluid receiving groove 262 may have an oval or spindle shape. In this case, the fluid receiving grooves 262 may have a long axis (a1-a2) that is defined toward a central axis Q of the first packing 260. Since the fluid receiving grooves 262 has an oval or spindle shape, a passage having a predetermined area may be maintained so that the fluid moves when the fluid receiving grooves 262 is pressed.

To increase the area maintenance effect, a reinforcement ring 265 inserted into the fluid receiving groove 262 may be further provided. As illustrated in FIG. 4, the reinforcement ring 265 has an outer circumferential surface having a ring shape corresponding to the shape of the fluid receiving groove 262.

The reinforcement ring 265 may reinforce rigidity of the fluid receiving groove 262 so that a predetermined passage is maintained even though the fluid receiving groove 262 is pressed by an external force.

Also, to increase the effect in which the fluid is accommodated to expand the fluid receiving grooves 262, thereby increasing watertightness, as illustrated in FIG. 5, an inner space part 263 for connecting inner ends of the fluid receiving grooves 262 may be further provided. The inner space part 263 according to the current embodiment may be defined along the inside of the first packing 260 and connected to the fluid receiving grooves 262. Thus, the fluid communicates through the fluid receiving grooves 262 and the inner space part 263.

Also, a cutoff line 264 may be defined between the inner space part 263 and the outside.

The cutoff line 264 may be used in a process for defining the inner space part 263 or used when various members are inserted in the inner space part 263. Also, the cutoff line 264 may be cut in a V shape from the outside to assist the fluid to be introduced into the inner space part 263 when the external pressure significantly increases.

A hygroscopic expansion part 600 formed of a hygroscopic material may be filled into the inner space part 263. When the hygroscopic expansion part 600 absorbs the fluid, the hygroscopic expansion part 600 expands in volume to further expand when compared to a case in which only the fluid is introduced into the inner space part 262, thereby improving a watertightness structure.

Referring to FIG. 6, the inner space part 263 may have a short axis (B1-B2) that is defined toward the central axis of the pipe 1. When the fluid is introduced into the inner space part 263 to increase a pressure in the inner space part 263, a pressure may be concentrated toward the short axis (B1-B2) to maximally expand the inner space part 263 toward the central axis of the pipe 1. That is, when the short axis (B1-B2) is defined toward the central axis of the pipe 1, the first packing 260 may be maximally expand toward the pipe 1 to tighten the watertightness structure.

As described above, when the fluid pressure in the pipe 1 increases, the fluid may be discharged through an end of the pipe 1 to flow between an outer circumferential surface of the pipe 1 and the inner circumferential surface of the flange 200 to pass through the third packing 280 and the second packing 270, thereby being reached the first packing 260. Here, the third packing 280 and the second packing 270 may successively form the watertightness structure, and the first packing 260 may maintain the watertightness structure when a relatively large pressure is generated, e.g., the fluid momentarily increases in pressure. That is, when relatively weak water impact exists, or relatively low pressure is generated, the second packing 270 and the third packing 280 may maintain the watertightness structure in response to the low fluid pressure. Also, when a relatively high water impact exists, or a relatively high fluid pressure is generated, the first packing may maintain the watertightness structure in response to the high fluid pressure.

Figure 7:
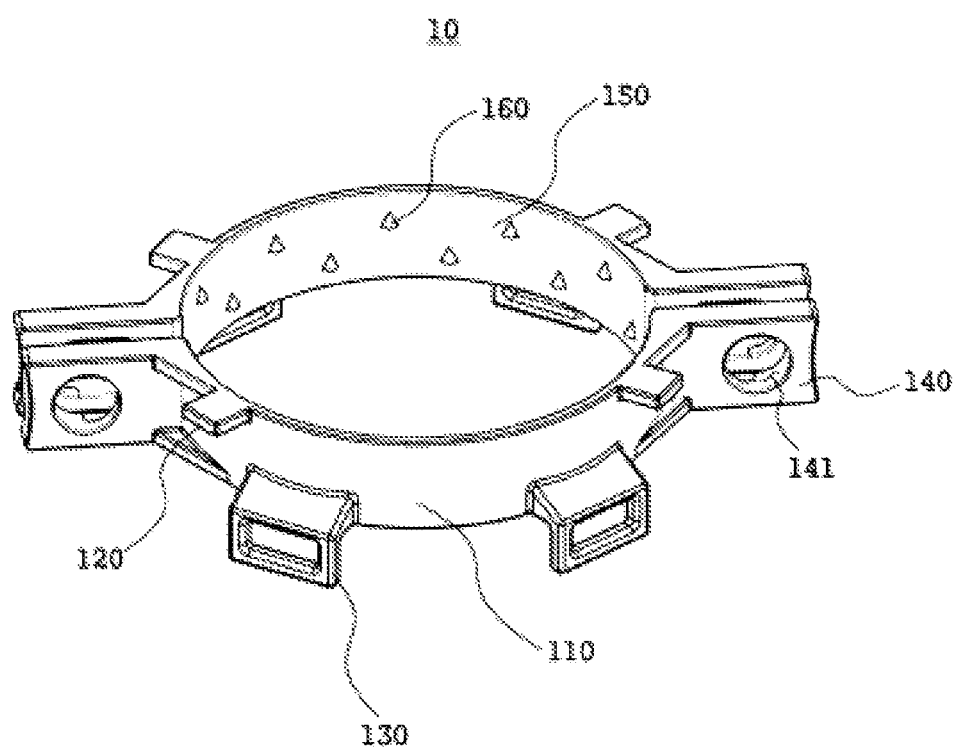
FIG. 7 is a perspective view of the clamp according to an embodiment.
Figure 9:
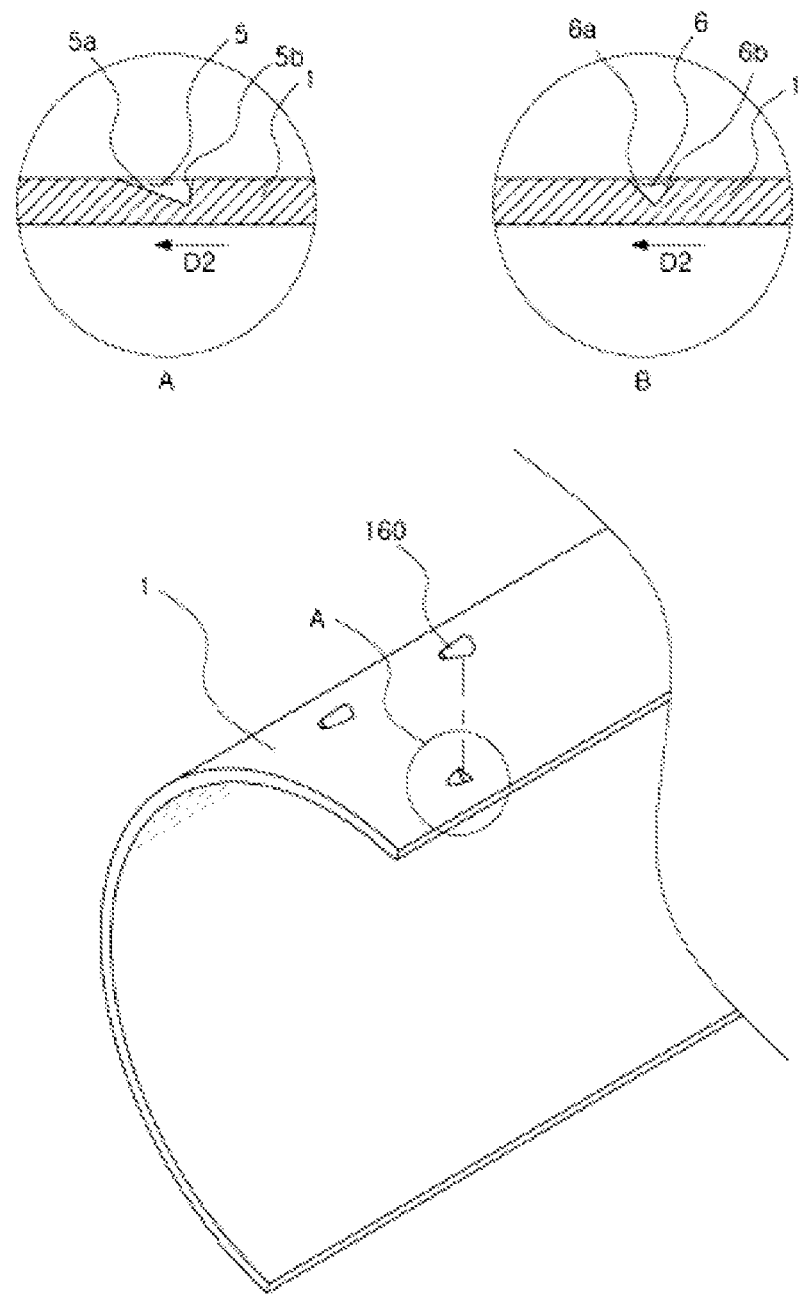
FIG. 9 is an enlarged view illustrating a pressing part and a state in which a pipe pressed by the pressing part according to an embodiment.
Figure 10:
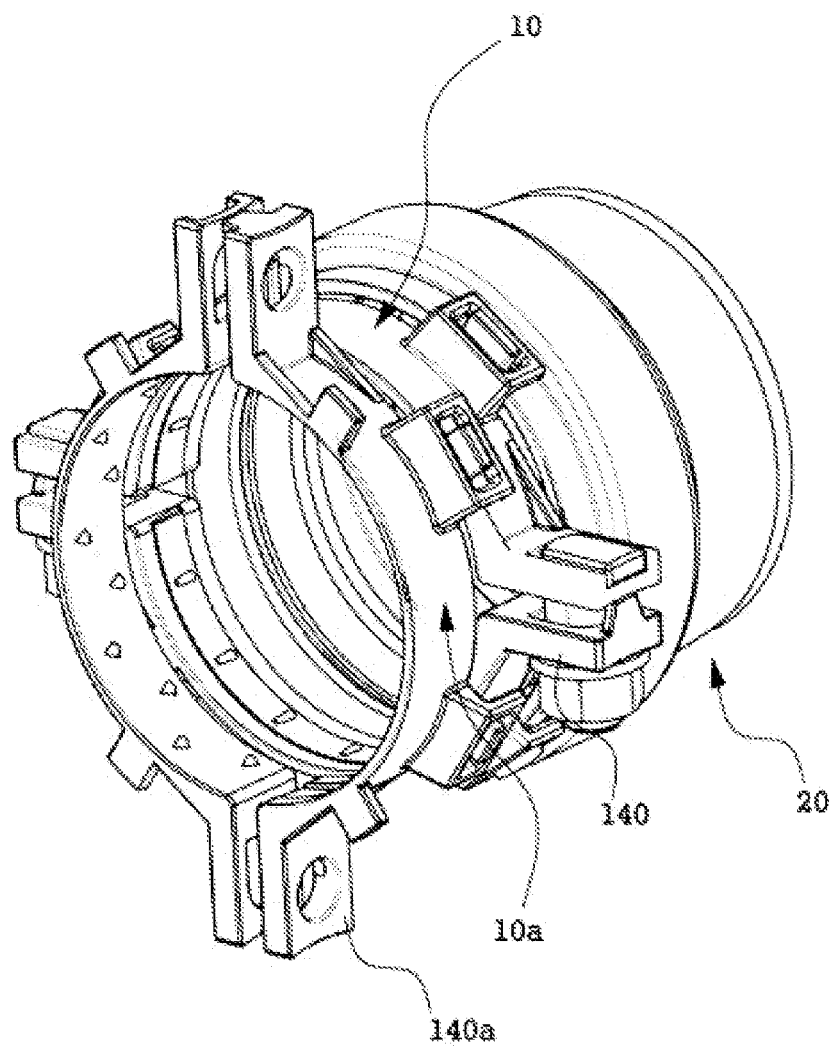
FIG. 10 is a perspective view illustrating a state in which the pipe is connected to the flange and the clamp according to an embodiment.

The clamp according to an embodiment will be described with reference to FIGS. 7 to 10. FIG. 7 is a perspective view of the clamp according to an embodiment, FIG. 8 is an exploded perspective view of the clamp according to an embodiment, FIG. 9 is an enlarged view illustrating a pressing part and a state in which a pipe pressed by the pressing part according to an embodiment, and FIG. 10 is a perspective view illustrating a state in which the pipe is connected to the flange and the clamp according to an embodiment.

The clamp 10 includes a clamping body 110 and a pressing part 160.

Figure 8:
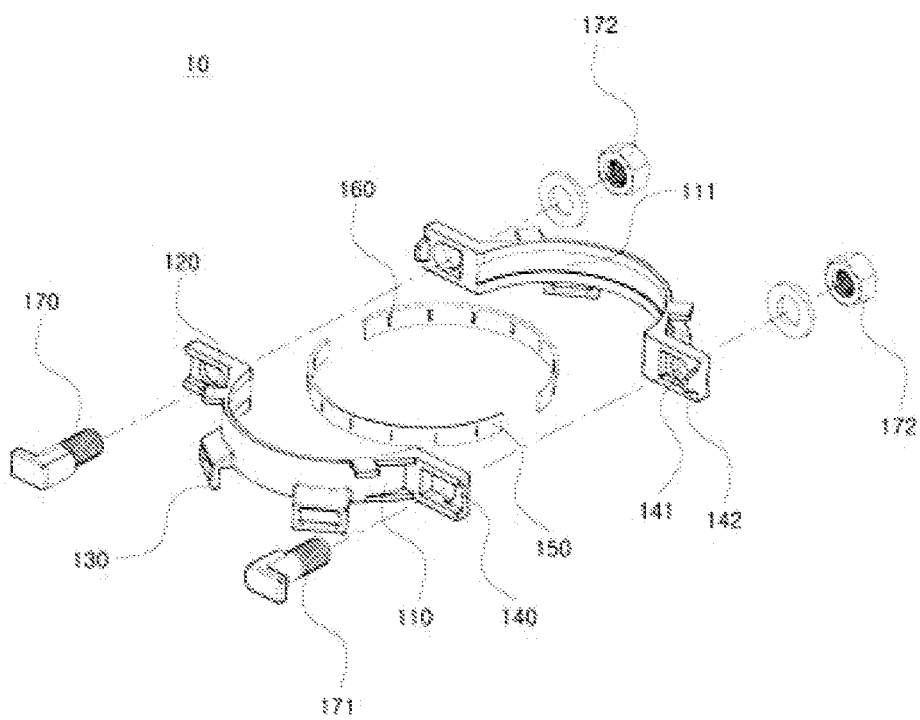
FIG. 8 is an exploded perspective view of the clamp according to an embodiment.

As illustrated in FIGS. 7 and 8, a pair of assembly members each of which has an arc shape are in contact with each other and fixed with each other to form the clamping body 110. A second fixing projection 120 may be formed on one end of an outer circumferential surface of the clamping body 110. When a plurality of clamps are successively connected to each other to fix the pipe, the second fixing projection 120 may be used to couple and connect the clamps adjacent to each other.

The second fixing projection 120 may be provided in plurality in a predetermined distance. A hook part 130 having a ring shape may be disposed on the other end of the outer circumferential surface of the clamping body 110 so that the second fixing projection 120 is hooked and coupled thereto. The second fixing projection 120 may pass from an inside of the hook part 130 of the other clamp toward the outside to connect two clamps to each other.

Extension parts 140 are disposed on both ends of each of assembly members constituting the clamp body 110. The extension parts 140 may extend outward from both ends of the assembly member. A coupling hole 141 may be defined in each of the extension parts 140 so that a bolt is accommodated therein. As illustrated in FIG. 8, the clamping body 110 may be fixed in a manner in which the bolt 171 passes through the coupling hole 141, and a nut 172 is coupled to the corresponding bolt 171. A spacing part 142 for spacing the pair of extension parts 140 from each other may be disposed any one of the extension parts 140 adjacent to each other when the clamping body 110 is assembled.

The spacing part 142 may space the extension parts 140 from each other to define a gap that is capable of being adjusted in width by the bolt 171 and the nut 172.

In the assembly member, the spacing part 142 may be disposed on only one extension part 140. Also, as illustrated in FIG. 8, the spacing part 142 may be disposed on both ends of any one of the pair of assembly members so that the assembly member on which the spacing part 142 is coupled to the assembly member on which the spacing part 142 is not disposed.

Due to the connection structure between the clamps or between the clamp and the flange, desired amounts of clamps may be rapidly easily successively installed in the site.

A fixing member accommodation part 111 for accommodating a pressing part fixing member 150 may be defined in an inner circumferential surface of the clamping body 110. The fixing member accommodation part 111 may be stepped in a predetermined depth from the inner circumferential surface of the clamping body 110 to prevent the pressing part fixing member 150 from being separated to the outside.

The pressing part fixing member 150 may be a molded object formed of a synthetic resin material. A pressing part 160 may be exposed inward from the inside of the pressing part fixing member 150 in a predetermined length. The pressing part fixing member 150 may have elasticity toward the center of the pipe.

The pressing part 160 may have a cone shape having a circular or polygonal longitudinal section shape or a truncated cone shape or faceted cone shape of which an apex is cut. When the clamping body 110 is tightened, the pressing part 160 may press the pipe inside to fix the pipe, thereby preventing the pipe from slipping or being separated. Here, the pressing part 160 may be disposed so that the apex of the pressing part 160 is oriented in a direction in which the pipe is separated. Also, the pressing part 160 may be disposed so that a bottom surface of the cone shape faces a direction in which the pipe is inserted. In this case, although the pipe is easily inserted, the pipe may be pressed by an edge of the bottom surface of the cone shape, and thus it is difficult that the pipe is separated from the clamping body 110. The pressing part having the horn bearing shape may fix the pipe formed of a high rigidity material such as stainless steel without slipping.

Referring to FIG. 9, the pressing part 160 according to the current embodiment may press the pipe 1 by the edge disposed between the bottom surface and a side surface thereof. That is, when the pipe is pressed, a groove 5 having an intaglio edge shape corresponding to the shape of each of the side surface and the bottom surface may be defined in the pipe 1. Referring to FIG. 9A, the edge-shaped groove 5 includes a first side surface 5a having a curved surface corresponding to the side surface of the pressing part 160 and a second side surface 5b having a plane shape corresponding to the bottom surface of the pressing part 160. Here, the first side surface 5a is defined in a direction D2 in which the pipe 1 is separated, and the second side surface 5b is defined in a direction opposite to the direction D2 in which the pipe 1 is separated, i.e., the pipe 1 is inserted. Here, the first side surface 5a may form an acute angle with respect to the outer circumferential surface of the pipe 1. The second side surface 5b may be approximately perpendicular to or perpendicular to the outer circumferential surface of the pipe 1. In this case, even though the pipe 1 intends to be separated from the clamp, the pressing part 160 may be hooked on the second side surface 5b or be inserted into the pipe 1 to prevent the pipe from being separated. On the other hand, when the pipe 1 is inserted into the clamp, the press 160 may allow the pipe 1 to be easily inserted into the clamp along the first side surface 5a that is relatively defined in the acute angle.

Referring to an enlarged view of FIG. 9B, according to the related art, a V-shaped groove is defined by using a protrusion simply protruding in a wedge shape. In this case, the groove 6 may be defined to have a V-shaped section to deteriorate fixability of the clamp, and thus it is difficult to fix the pipe such as the stainless steel pipe without a separate pre-task.

Referring to FIG. 10, the pipe may be inserted and accommodated into the flange 20 and be fixed by using an appropriate number of clamps 10 and 10a depending on the required fixing force. Here, when a plurality of clamps 10 are connected, to secure a space for successively coupling the clamps 10 and 10a, the clamps 10 and 10a may be twisted to be coupled so that the extension parts 140 and 140a of the clamps 10 and 10a adjacent to each other do not overlap.

Figure 11:
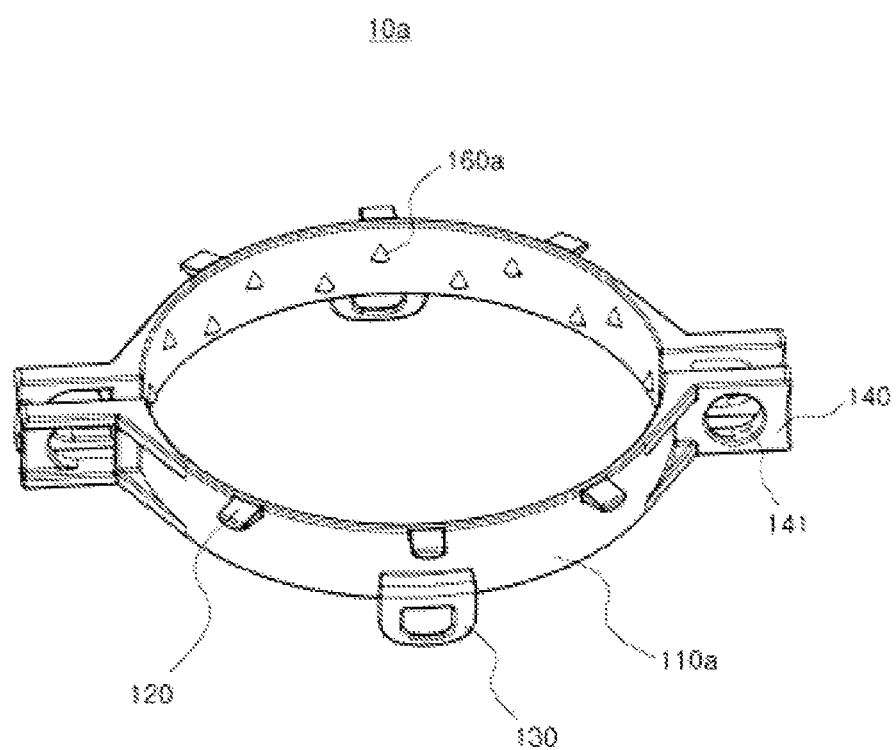
FIG. 11 is a perspective view of a clamp according to another embodiment.

A clamp according to another embodiment will be described with reference to FIGS. 11 and 12. FIG. 11 is a perspective view of a clamp according to another embodiment, and FIG. 12 is an exploded perspective view of the clamp according to another embodiment.

The clamp 10a according to the current embodiment is different from the clamp 10 according to the foregoing embodiment in that the pressing part fixing member is not disposed inside a clamping body 110a.

That is, in the current embodiment, pressing parts 160a may be directly disposed on an inner circumferential surface of the clamping body 110a. Each of the pressing part 160a according to the current embodiment has a shape in which a cone is cut in half in a longitudinal direction to protrude from the inner circumferential surface of the clamping body 110a. Here, the pressing parts 160a may be disposed in a line along the inner circumferential surface of the clamping body 110a. To improve the fixing force, as illustrated in FIG. 11, the pressing parts 160a may be disposed to be twisted in the longitudinal direction.

Figure 12:
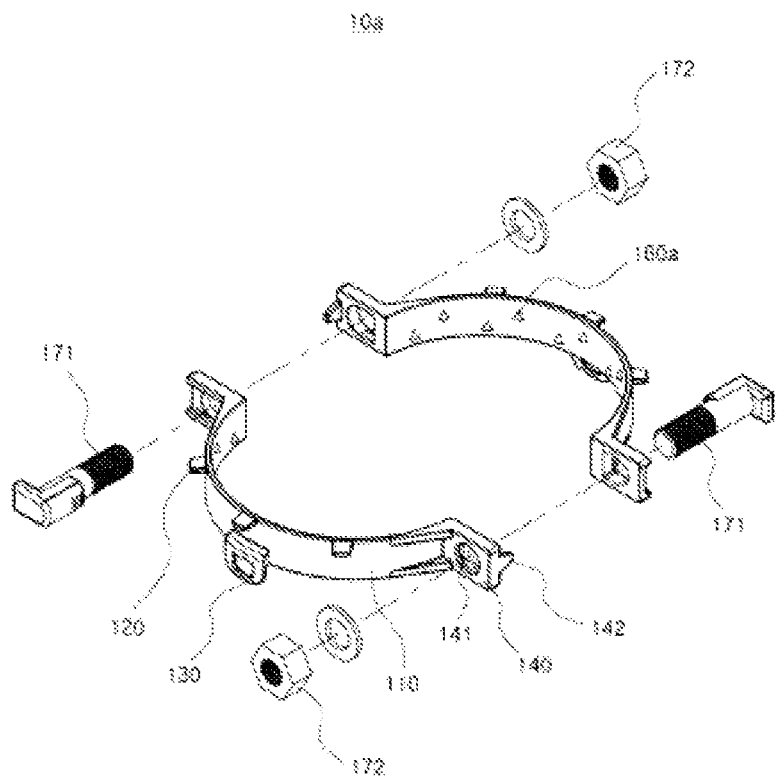
FIG. 12 is an exploded perspective view of the clamp according to another embodiment.

When the clamping body 110a is assembled, as illustrated in FIG. 12, the clamping body 110a is assembled without the pressing part fixing member. When the bolt 171 and the nut 172 pass through the coupling hole 141 and be coupled and tightened to each other, the pressing part 160 may press the pipe inside to fix the pipe.

Since other components except for the pressing part 160a are the same as those in the foregoing embodiment, detailed descriptions with respect to the other components will be omitted.

As described above, the flange for connecting the pipe and the clamp according to the present invention may be improved in fixing force and sealability corresponding to the water impact in comparison to the same devices according to the related art. Thus, if the pipe is the stainless steel pipe, the flange and the clamp may be easily installed without a separate pre-task or coating work.

Figure 13:
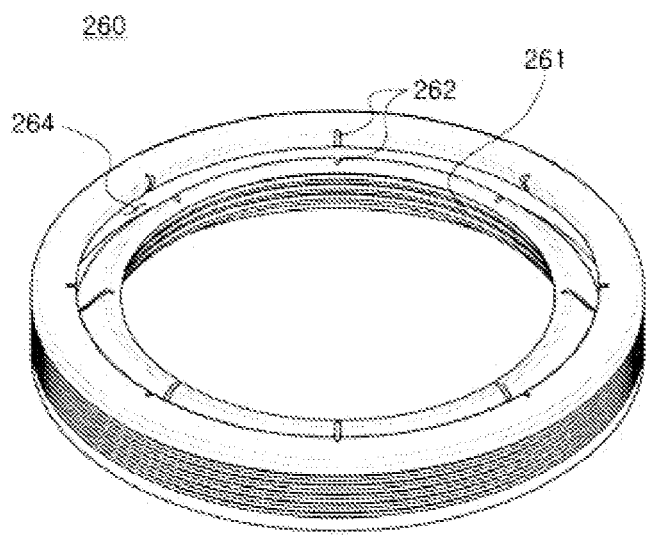
FIG. 13 is a perspective view of a first packing according to another embodiment.

A first packing 260 according to another embodiment will be described with reference to FIG. 13. FIG. 13 is a perspective view of the first packing according to another embodiment.

Although the first packing 260 according to the current embodiment has the same components as those of the first packing 260 of FIG. 4 that is described above, the first packing 260 according to the current embodiment is different in that cutoff lines 264 are in a spread state in an initial state instead of the first packing 260 is installed in the pipe.

That is, as illustrated in FIG. 13, the cutoff lines 264 are initially defined in a spread state, and when the watertightness structure is provided by using the first packing 260, the cutoff lines 264 contact each other. In this case, initially, water flowing in the pipe may be actively accommodated through the spread cutoff lines 264. However, after the first packing 260 is installed, an introduction passage into which the water is accommodated may be limited to the fluid receiving grooves 262 to increase an inner pressure of the first packing 260.

Figure 14:
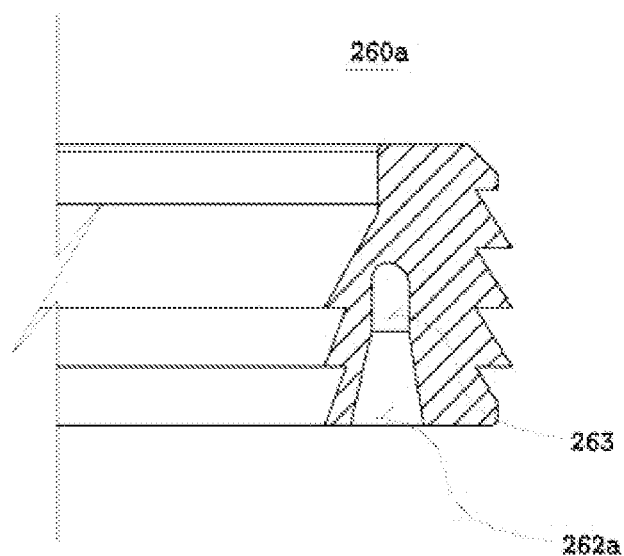
FIG. 14 is a cross-sectional view of the first packing according to another embodiment.

A first packing according to further another embodiment will be described with reference to FIG. 14. FIG. 14 is a partial-section view of a first packing according to further another embodiment.

A first packing 260a according to the current embodiment has a fluid receiving grooves 262a having a shape different from that of the above-described first packing. The fluid receiving grooves 262a according to the current embodiment is defined in the same position and direction as those of the above-described fluid receiving holes. However, the fluid receiving grooves 262a according to the current embodiment is different in that the fluid receiving grooves 262a has a sectional area that gradually decreases in size toward the inner space part 263, i.e., has a tapered inner surface.

The fluid receiving grooves 262a having a tapered shape may function as a check valve to allow the water to be easily introduced into the inner space part 263. Here, on the contrary, it may be difficult that the water is discharged from the inner space part 263.

Foregoing embodiments give further detailed description to help understanding of the prevent invention, but do not limit the scope of the present invention. Various clamps for connecting pipes may be realized without departing from the spirit and scope of the present invention as defined by the following claims. Therefore, the preferred embodiments should be considered in descriptive sense only and not for purposes of limitation.

The invention claimed is:

1. A device for connecting a first pipe to a second pipe, the device comprising:
 a clamp comprising a first clamp and a second clamp each comprising a clamping body formed by coupling at least two assembly members each of which has an arc shape; and
 a flange comprising a flange body having a first accommodation part to which the clamp is connected and configured for accommodating one end of the second pipe and a second accommodation part configured for accommodating one end of the first pipe so that the first pipe and the second pipe define a successive passage, and a packing part configured to be disposed between an outer circumferential surface of the second pipe and an inner circumferential surface of the first accommodation part to provide a structure with watertightness;
 wherein the flange body having a first fixing projection protruding from an outer circumferential surface of the flange body,
 wherein the clamping body has a hook part formed in a ring shape and protruding from an outer circumferential surface of the clamping body and a second fixing protrusion radially protruding from the outer circumferential surface of the clamping body,
 wherein the first fixing projection of the flange body is inserted into the hook part of the first clamp so that the first clamp is connected to the flange, and
 wherein the second fixing projection of the first clamp is inserted into the hook part of the second clamp so that the second clamp is connected to the first clamp.

2. The device of claim 1, wherein the clamp further comprising a pressing part disposed inside the clamping body and configured to press an outer circumferential surface of the second pipe that is inserted into the clamping body, and
 wherein the pressing part has at least one shape of a cone shape and a polygonal cone shape having an apex oriented in a direction in which the second pipe is separated and a bottom surface facing a direction in which the second pipe is inserted, or
 the pressing part has at least one shape of a cone shape and a polygonal shape of which a relatively small bottom surface faces the direction in which the second pipe is separated and a relatively large bottom surface faces the direction in which the second pipe is inserted.

3. The device of claim 1, wherein the clamp further comprises a pressing part disposed inside the clamping body to press an outer circumferential surface of the second pipe that is inserted into the clamping body, and
 wherein the pressing part integrally protrudes from an inner circumferential surface of the clamping body.

4. The device of claim 1, wherein the clamp further comprises a pressing part disposed inside the clamping body to press an outer circumferential surface of the second pipe that is inserted into the clamping body and a pressing part fixing member having elasticity and disposed on the inner circumferential surface of the clamping body on which the pressing part is disposed, and
 wherein the clamping body comprises a fixing member accommodation part defined to be stepped from the inner circumferential surface thereof in a predetermined depth to accommodate the pressing part fixing member so that the pressing part fixing member is not separated from the clamping body.

5. The device of claim 1, wherein each of the assembly members comprises extension parts extending outward on ends thereof, and
 each of the extension parts comprises a coupling hole passing therethrough to couple the assembly members to each other.

6. The device of claim 5, wherein at least one of the extension parts comprises a spacing part protruding therefrom so that the extension parts adjacent to each other are spaced apart from each other.

7. A device for connecting first pipe to a second pipe, the device comprising:
 a clamp comprising a clamping body formed by coupling at least two assembly members each of which has an arc shape; and
 a flange comprising a flange body having a first accommodation part to which the clamp is connected and configured for accommodating one end of the second pipe and a second accommodation part configured for accommodating one end of the first pipe so that the first pipe and the second pipe define a successive passage and a packing part configured to be disposed between an outer circumferential surface of the second pipe and an inner circumferential surface of the first accommodation part to provide a structure with watertightness,
 wherein the packing part comprises a first packing having a plurality of fluid receiving grooves for receiving a fluid flowing through the first pipe and the second pipe,
 wherein the first packing expands when one of the plurality of fluid receiving grooves receives the fluid flowing through the first pipe and the second pipe,
 wherein the first packing comprises an inner space part defined along an inside thereof,
 wherein each of the fluid receiving grooves is communicated to the inner space part, and wherein the plurality of fluid receiving grooves are disposed separated to each other.

8. The device of claim 7, wherein each of the plurality of fluid receiving grooves has an oval or spindle shape and has a long axis in a longitudinal cross-sectional shape, which faces a central axis of the second pipe.

9. The device of claim 7, wherein the plurality of fluid receiving grooves are connected to each other through the inner space part.

10. The device of claim 7, wherein the inner space part has an oval longitudinal section shape or a spindle longitudinal section shape and has a short axis in a longitudinal cross-sectional shape, which faces a central axis of the second pipe.

11. The device of claim 7, wherein the first packing comprises a cutoff line that is cut from the inner space part to the outside.

12. The device of claim 7, further comprises a reinforcement ring inserted into each of the plurality of fluid receiving grooves to be maintained in a predetermined cross-sectional shape to reinforce rigidity so that a passage is secured even though each of the plurality of fluid receiving grooves is pressed by an external force.

13. The device of claim 7, wherein the flange body comprises an insertion restriction part protruding from an inner circumferential surface of the second accommodation part to restrict an insertion depth of the second pipe.

14. The device of claim 13, wherein the packing part further comprises:
   a second packing disposed between the insertion restriction part and the first packing; and
   a third packing disposed between the second packing and the insertion restriction part,
   wherein the second packing has a curved surface in contact with the outer circumferential surface of the second pipe.

15. The device of claim 14, wherein the insertion restriction part has an inner end protruding upward to prevent the third packing from being separated.

16. The device of claim 7, further comprising a hygroscopic expansion part formed of a hygroscopic material and disposed in the inner space part to absorb the fluid to improve watertightness performance.

17. A device for connecting first pipe to a second pipe, the device comprising:

a clamp comprising a clamping body formed by coupling at least two assembly members each of which has an arc shape; and a flange comprising a flange body having a first accommodation part to which the clamp is connected and configured for accommodating one end of the second pipe and a second accommodation part configured for accommodating one end of the first pipe so that the first pipe and the second pipe define a successive passage and a packing part configured to be disposed between an outer circumferential surface of the second pipe and an inner circumferential surface of the first accommodation part to provide a structure with watertightness, wherein the packing part comprises a first packing having a plurality of fluid receiving grooves for receiving a fluid flowing through the first pipe and the second pipe, wherein the first packing expands when one of the plurality of fluid receiving grooves receives the fluid flowing through the first pipe and the second pipe, wherein the clamping body comprises a hook part having a ring shape and protruding from an outer circumferential surface thereof, and the flange body comprises a first fixing projection protruding from an outer circumferential surface thereof so that the first fixing projection is inserted into the hook part and connected to the clamping body.

\* \* \* \* \*